United States Patent
Pandey et al.

(10) Patent No.: US 8,874,415 B2
(45) Date of Patent: Oct. 28, 2014

(54) SYSTEM AND METHOD FOR FORMING FAILURE ESTIMATES FOR A HEAT RECOVERY STEAM GENERATOR

(75) Inventors: Achalesh Kumar Pandey, Greenville, SC (US); Deepali Nitin Bhate, Karnataka (IN); Shivappa Ningappa Goravar, Karnataka (IN); David Lee Rogers, Marietta, GA (US)

(73) Assignee: General Electric Company, Schenectady, NY (US)

( * ) Notice: Subject to any disclaimer, the term of this patent is extended or adjusted under 35 U.S.C. 154(b) by 438 days.

(21) Appl. No.: 13/343,341

(22) Filed: Jan. 4, 2012

(65) Prior Publication Data

US 2013/0173231 A1     Jul. 4, 2013

(51) Int. Cl.
*G06F 17/50* (2006.01)
*G05B 17/02* (2006.01)
*G05B 13/04* (2006.01)

(52) U.S. Cl.
CPC ............ *G05B 17/02* (2013.01); *F05D 2270/71* (2013.01); *G05B 13/04* (2013.01)
USPC .......................................................... 703/2

(58) Field of Classification Search
CPC ..... F05D 2270/71; G05B 17/02; G05B 13/04
USPC .......................................................... 703/2
See application file for complete search history.

(56) References Cited

U.S. PATENT DOCUMENTS

| 5,050,108 A | 9/1991 | Clark et al. |
| 5,517,851 A | 5/1996 | Berthold et al. |
| 2009/0138211 A1 | 5/2009 | Gobrecht et al. |
| 2010/0100248 A1* | 4/2010 | Minto et al. ................... 700/287 |

FOREIGN PATENT DOCUMENTS

| JP | 4184137 A | 7/1992 |
| JP | 9218195 A | 8/1997 |
| JP | 2003232719 A | 8/2003 |
| JP | 2004144549 A | 5/2004 |
| JP | 2005147797 A | 6/2005 |
| JP | 2007205692 A | 8/2007 |
| JP | 2009145185 A | 7/2009 |

OTHER PUBLICATIONS

David Balevic, Steven Hartman, Ross Toumans, "Heavy-Duty Gas Turbine Operating and Maintenance Considerations" GE Atlanta Georgia, Oct. 1, 2010, 60 pages.*

* cited by examiner

*Primary Examiner* — Dwin M Craig
(74) *Attorney, Agent, or Firm* — Cantor Colburn LLP

(57) ABSTRACT

A method of forming a failure estimate for one or more components of a heat recovery steam generator (HRSG) includes forming from failure models and at least one of fired hours and fired starts, factored hours and factored starts. The factored hours and/or starts are applied to failure equations for the one or more components to form the failure estimate.

15 Claims, 3 Drawing Sheets

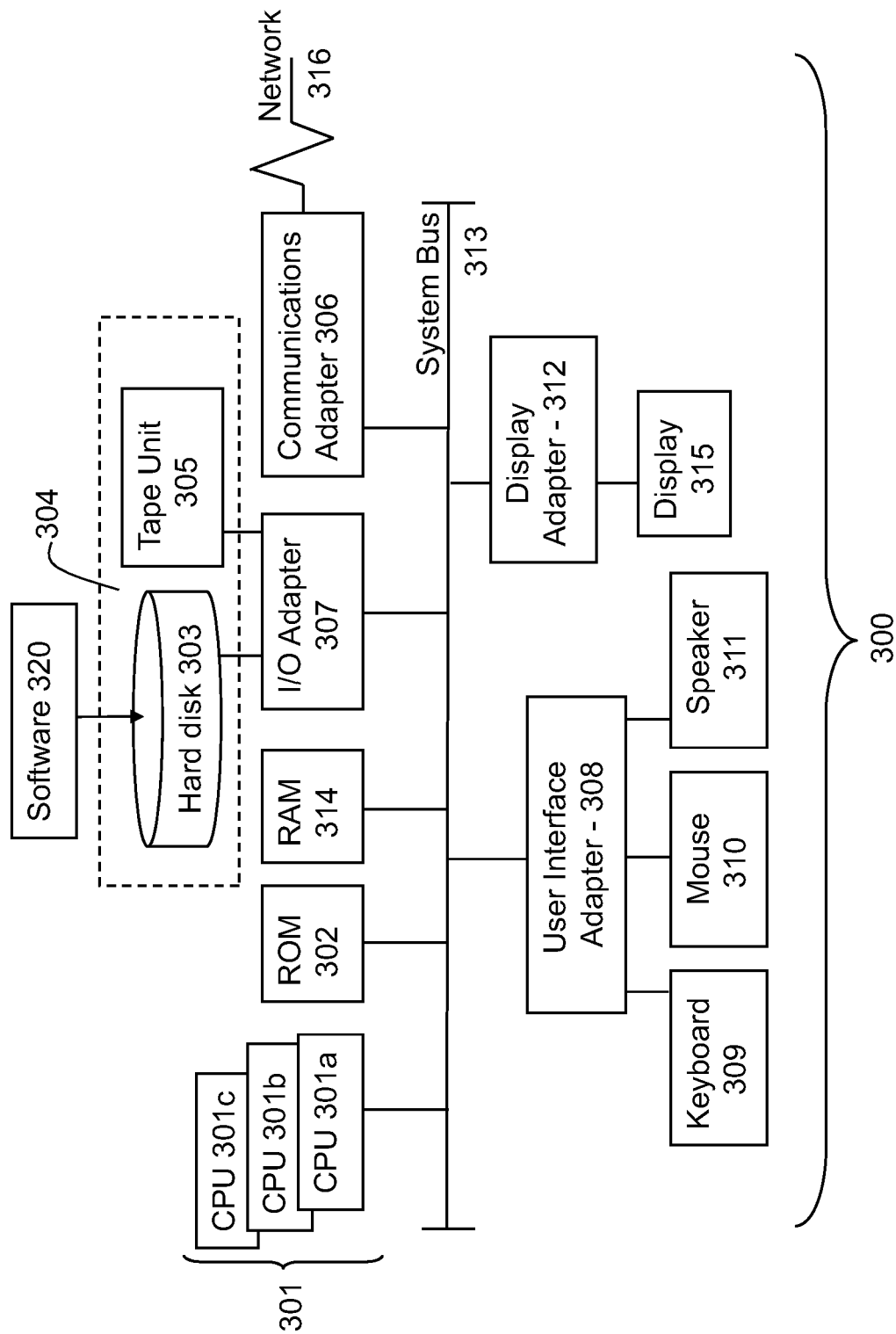

SYSTEM AND METHOD FOR FORMING FAILURE ESTIMATES FOR A HEAT RECOVERY STEAM GENERATOR

BACKGROUND OF THE INVENTION

The subject matter disclosed herein relates to monitoring and, in particular, to monitoring the operations of a heat steam recovery generator to predict failures or lifetimes of components thereof.

Steam turbines can be used to produce electricity and require a source of steam to operate. One approach to generating steam used in combined-cycle power plants is to pass hot exhaust from a gas turbine into a heat recovery steam generator (HRSG). Water in tubes in the HRSG is heated by the hot exhaust to form steam that is provided to and drives one or more steam turbines.

Several factors effect the lifting and maintenance needs of an HRSG. The most prevalent cause of HRSG failure lies in failure of the tubes that carry water/steam around the HRSG. Some sources of failure include creep, fatigue, and corrosion.

BRIEF DESCRIPTION OF THE INVENTION

According to one aspect of the invention, a computer implemented method of forming a failure estimate for one or more components of a heat recovery steam generator (HRSG) is disclosed. In this aspect, the method includes: receiving at a computing device failure models for one or more components of the HRSG; receiving an indication of one or both of fired hours and fired starts of a turbine to which the HRSG is coupled; forming from the failure models and at least one of the received fired hours and fired starts, at least one of factored hours and factored starts; receiving failure equations for the one or more components; and forming the failure estimate by applying at least one of the factored hours and the factored starts to the failure equations.

According to another aspect of the invention, a computer implemented method of forming a failure estimate of one or more components of a heat recovery steam generator (HRSG) is disclosed. In this aspect, the method includes: receiving at the computing device failure models for the one or more components of the HRSG; receiving an indication of at least one property of a fluid contained within the HRSG; forming from the failure models and the at least one property, a estimate of the amount of wall thinning of the one or more components; receiving failure equations for the one more components; and forming the failure estimate by applying the amount of wall thinning to the failure equations.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 3 illustrates a computing system on which embodiments of the present invention may be implemented.

The detailed description explains embodiments of the invention, together with advantages and features, by way of example with reference to the drawings.

DETAILED DESCRIPTION OF THE INVENTION

Embodiments of the present invention may utilize a combination of physics based and empirical models to generate component life predictions or condition based maintenance or inspection recommendations. According to one embodiment, the predictions/recommendations are made for an HRSG.

Figure 1:
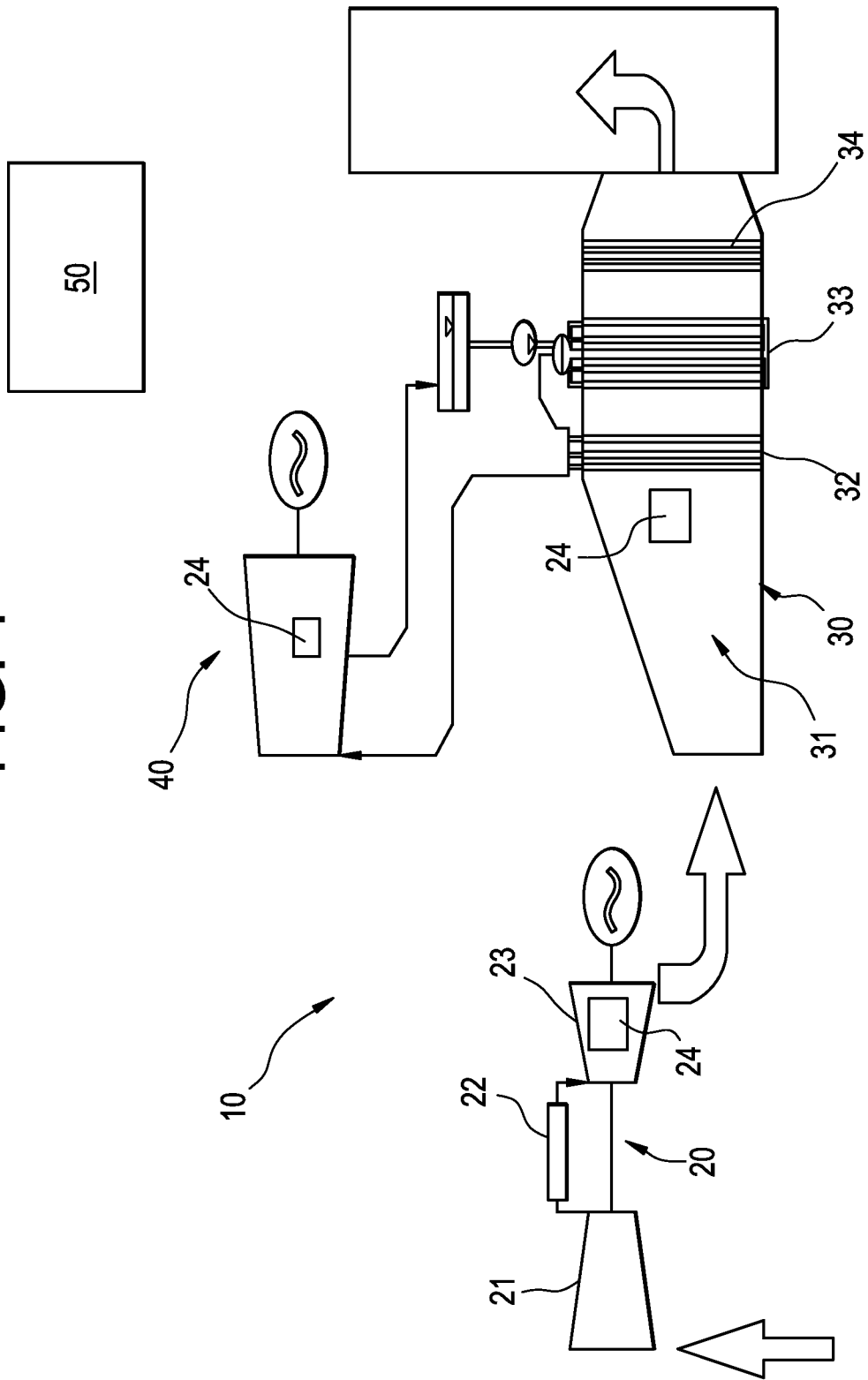
FIG. 1 is a simplified diagram of combined cycle power plant.

FIG. 1 illustrates a combined cycle power plant 10. The combined cycle power plant 10 includes a gas turbine engine 20 that produces power and exhaust energy, a heat recovery steam generator (HRSG) 30 that captures the exhaust energy produced in the gas turbine engine 20 and uses the exhaust energy to convert water to steam and a steam turbine engine 40. The steam produced in the HRSG 30 is transmitted to the steam turbine engine 40 where the steam is expanded to produce additional power.

The gas turbine engine 20 of the combined cycle power plant 10 includes a compressor 21, a combustor array 22 and a turbine section 23. The compressor 21 compresses inlet air, the combustor array 22 combusts a mixture of fuel and the compressed inlet air and the turbine section 23 expands the products of the combustion to produce power and the exhaust energy. The HRSG 30 is disposed downstream from an outlet of the turbine section 23 and is thereby receptive of the exhaust energy. The HRSG 30 is formed to define an HRSG interior 31 through which high pressure tubes 32, intermediate pressure tubes 33 and low pressure tubes 34 extend. The high pressure tubes 32, intermediate pressure tubes 33 and low pressure tubes 34 define high pressure, intermediate pressure and low pressure stages of the HRSG 30 and carry water that is heated by the exhaust energy. The heated water is thereby converted to steam that is transmitted to the steam turbine engine 40.

According to one embodiment, one or more of the gas turbine 20, the steam turbine 40 and the HRSG 30 can include one or more sensors 24 disposed therein. These sensors 24 can provide information to a controller 50 by any known or later developed manners. For example, the sensors 24 can provide information in a wireless or wired manner to the controller 50. The sensors 24 can measure, for example, pressure, temperature, flow rate and the like at several locations in the plant 10. It shall be understood, however, that in some cases, metal temperatures are not directly measured but, rather, are estimated based on steam pressure and known parameters (e.g., size and shape) of the tubes in the HRSG 30.

According to one embodiment, a system of multiple power plants 10 is provided and the information collected by the controller 50 can be used to develop maintenance factor models. The maintenance factor models can also be formed based on a finite element method (FEM) (e.g., a finite element analysis (FEA)) for a particular HRSG 30 or a combination of FEM and information collected by the controller. These models can be used to solve, for example, an amount of life consumed per hour of use or per start (and based on the type of start). In more detail, by applying actual hours and starts to the maintenance factor models, factored hours and factored starts can be determined. The factored hours and factored starts can then be applied to empirically formed risk models to determine survival/risk numbers for a particular HRSG. In this manner, both physics based models (maintenance factor models) and empirical models are used to determine the failure probabilities that can be used for lifing estimates and condition based maintenance (CBM). As such, a technical effect of the present is that it allows for the combination of both models and empirical evidence in the preparation of lifing estimates and CBM estimates.

Figure 2:
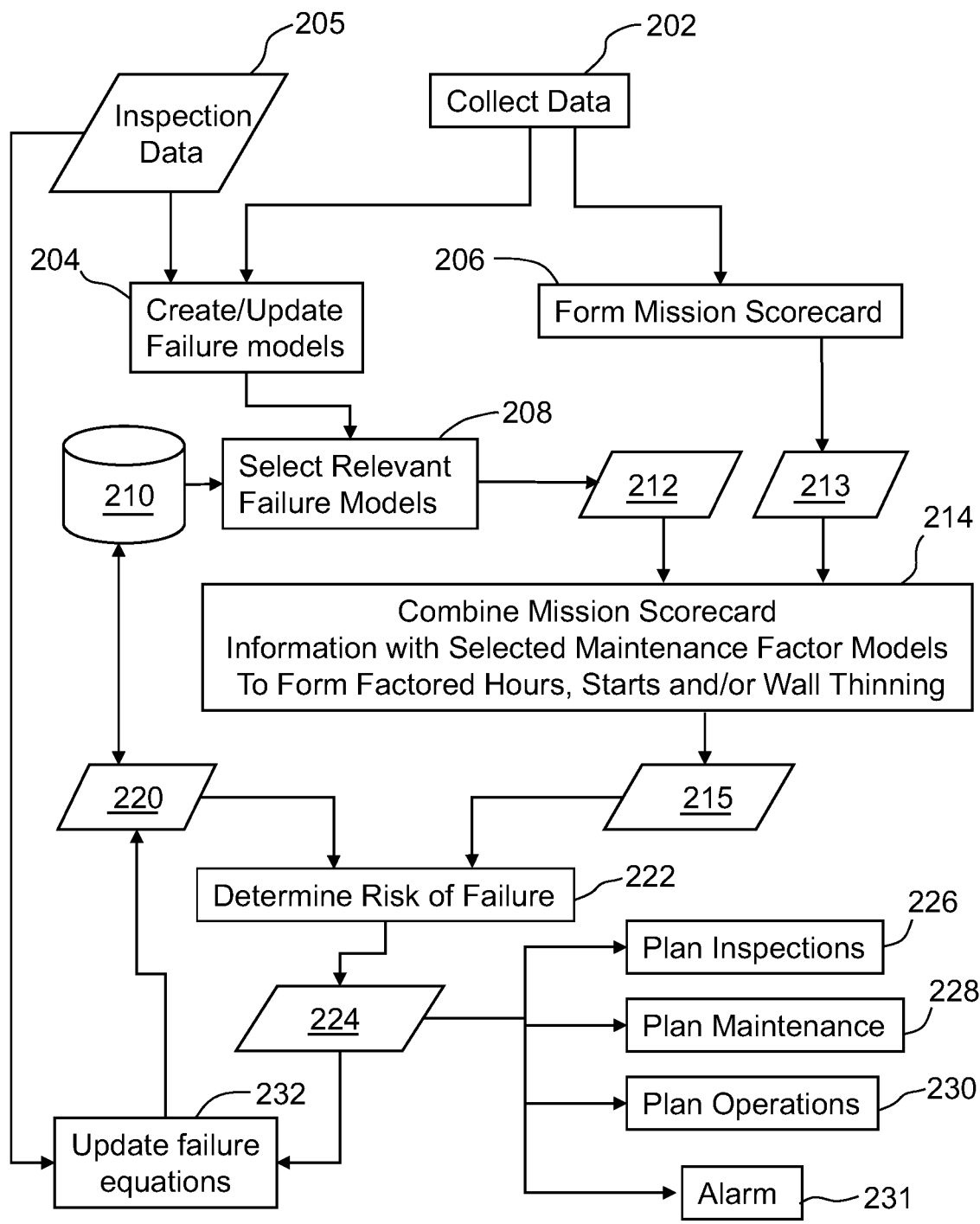
FIG. 2 is a dataflow diagram illustrating a method according to an embodiment of the present invention.

Referring now to FIG. 2, a dataflow diagram is presented to illustrate a method according to one embodiment. The method begins at block 202 where data is collected from the plant. According to one embodiment, the plant is in the form as shown in FIG. 1. The data that is collected could include, for example, parameters related to the gas turbine 20. For example, the parameters could include, exhaust gas temperature and load. The data collected could also include parameters related to the HRSG 30. For example, the parameters could include the steam pressures, temperatures, and flow rates for one or more of the sections. The parameters for the HRSG could also include, for example, feed water flow temperature, pressure and flow rate, drum and header metal temperature and duct burner status. In addition, the HRSG information can include information about the chemistry of the water in each section such as the water's pH, cation conductivity, and levels of one or more of dissolved oxygen, sodium, phosphate, iron and chloride. In addition, it shall be understood that the other information, such as field inspection and historical failure data for one or more of the gas turbine 20, the HRSG 30 and the steam turbine 40 can also be collected at block 202. Further, it shall be understood that the data collection performed at block 202 can be periodic or continuous.

The data collected at block 202 can be used for at least two purposes. First, the data can be stored and later used to develop empirically based failure models. These models can be formed, for example, by analyzing the operating conditions/history of HRSG units that failed. In one embodiment, the failure models are based on fired hours and the number and type of fired starts experienced over the life the HRSG from a start time (e.g., when installed or serviced) until a failure occurred. It shall be understood that failure models can be broken down by individual components (e.g. economizers, evaporators, and superheaters) and by the location in the HRSG (e.g., high, intermediate and low pressure stages). In this manner, each particular component in a particular HRSG can have a separate failure model associated with it. The creation of the failure models is illustrated in FIG. 2 at block 204.

The failure models can also include a wall thinning failure model. By combining known curves for particular metals that compare corrosion to one or more of fluid velocity, temperature, pH, geometry, dissolved oxygen and the like, general equations can be formed that model wall thinning in particular components of an HRSG (e.g. in the tubes that transport fluid/steam).

In one embodiment, the failure models can then be fit to actual failure data for failures that occurred across a fleet or other sample space to refine them. In one embodiment, the failure models describe the amount of useful life of a component that a certain amount/type of operation consumes. Such equations can generally take the form:

$$FM_i = f(x_1, x_2 \ldots x_n)$$

where i represents a particular component. It shall be understood that the failure models can be continually or periodically updated based either on new data or based on the results of inspection data 205, for example. In some cases, the failure models can describe failure based on hours and starts as separate equations or they can be combined into a single equation.

The particular configuration of the HRSG under consideration can dictate which of the failure models are selected and solved. Accordingly, for a particular HRSG, a database 210 that includes the specific configuration of the HRSGs in a fleet can be consulted to select (block 208) the relevant failure models 212 based on the specific components included in the HRSG.

Second, the data collected at block 202 can be used to form a mission scorecard 213 for the HRSG as indicated at block 206. In one embodiment, the mission scorecard is created based on past and present data in realtime or periodically. The mission scorecard can be thought of as the online monitoring HRSG operation in one embodiment. The mission scorecard can include, for example, information about the HRSG itself as well as the plant in which the HRSG is operating. The scorecard 213 can include, for example, cycle based information such as the number and type of starts of the plant, ramp rates, pressure and temperature changes, type of start (e.g. hot, warm, cold start etc.), gas turbine non-running hours, forced cooling of gas turbine etc. The scorecard 213 can also include exposure-based information such as, for example, fired hours and starts, holdtime at peak load, temperatures of various components over time and water chemistry. In addition, operational information such as startup/shutdowns, steady state operational times, load turndown, duct burner status and forced cooling indication can be included in the scorecard 213.

Given the relevant failure models 212 and the scorecard 213, factored hours and starts as well as an amount of wall thinning (data block 215) can be created at block 214. The "factored" heading applied to hours/starts means the failure models 212 have been adjusted to represent the actual conditions experienced by a particular HRSG.

As discussed above, data from a fleet of HRSG can be collected at block 202. This data can generally determine the number of fired hours and fired starts that a particular HRSG experienced before failing. Given a large sample size, equations 220 describing the probability of failure of particular components based on fired hours/starts or other variables discussed above can be created as indicated. For ease of description, the probability of failure equations 220 are shown as being stored in database 210 but they could be stored anywhere and could be created, for example, from the data collected in block 202. The fired hours/starts and/or wall thinning data in data block 215 is applied to the failure equations 220 at block 222 to form failure estimates 224. It shall be understood that these failure estimates 224 can be for individual elements of an HRSG. The failure estimates 224 can also be referred to herein as lifing estimates and can represent the amount of remaining life of a particular component.

The particular use to which the failure estimates 224 may be applied is extensive and can include, for example, planning inspections (block 226), maintenance (block 228) or operational constraint planning (block 230). Operational constraint planning can include running a particular unit in a certain manner such as to prolong the life of an at-risk component. The failure estimates 224 can also be used to generate any number of reports or other visualizations. Of course, the failure estimates 224 could also be used in realtime to generate alarms 231 or other indications as desired in a particular instance.

According to one embodiment, the inspection data 205 and the failure estimates 224 can be compared to update the failure equations 220 as indicated by block 232. Such updating can be performed using a Bayesian analysis or any other model updation technique now known or later developed.

FIG. 3 shows an example of a computing system 300 on which embodiments of the present invention may be implemented. In this embodiment, the system 300 has one or more central processing units (processors) 301a, 301b, 301c, etc. (collectively or generically referred to as processor(s) 301). In one embodiment, each processor 301 may include a reduced instruction set computer (RISC) microprocessor. Processors 301 are coupled to system memory 314 and various other components via a system bus 313. Read only memory (ROM) 302 is coupled to the system bus 313 and may include a basic input/output system (BIOS), which controls certain basic functions of the system 300.

FIG. 3 further depicts an input/output (I/O) adapter 307 and a network adapter 306 coupled to the system bus 313. The I/O adapter 307 may be a small computer system interface (SCSI) adapter that communicates with a hard disk 303 and/or tape storage drive 305 or any other similar component. The I/O adapter 307, hard disk 303, and tape storage device 305 are collectively referred to herein as mass storage 304. A network adapter 306 interconnects bus 313 with an outside network 316 enabling the computing system 300 to communicate with other such systems. A screen (e.g., a display monitor) 315 is connected to system bus 313 by a display adaptor 312, which may include a graphics adapter to improve the performance of graphics intensive applications and a video controller. In one embodiment, adapters 307, 306, and 312 may be connected to one or more I/O busses that are connected to system bus 313 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 313 via user interface adapter 308 and display adapter 312. A keyboard 309, mouse 310, and speaker 311 are all interconnected to bus 313 via user interface adapter 308, which may include, for example, a Super I/O chip integrating multiple device adapters into a single integrated circuit.

Thus, as configured in FIG. 3, the system 300 includes processing means in the form of processors 301, storage means including system memory 314 and mass storage 304, input means such as keyboard 309 and mouse 310, and output means including speaker 311 and display 315.

It will be appreciated that the system 300 can be any suitable computer or computing platform, and may include a terminal, wireless device, information appliance, device, workstation, mini-computer, mainframe computer, personal digital assistant (PDA) or other computing device. It shall be understood that the system 300 may include multiple computing devices linked together by a communication network. For example, there may exist a client-server relationship between two systems and processing may be split between the two.

The system 300 also includes a network interface 306 for communicating over a network 316. The network 316 can be a local-area network (LAN), a metro-area network (MAN), or wide-area network (WAN), such as the Internet or World Wide Web. Users of the system 300 can connect to the network through any suitable network interface 306 connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

As disclosed herein, the system 300 includes machine-readable instructions stored on a tangible machine readable media (for example, the hard disk 303) for capture and interactive display of information shown on the screen 315 of a user. As discussed herein, the instructions are referred to as "software" 320. The software 320 may be produced using software development tools as are known in the art. The software 320 may include various tools and features for providing user interaction capabilities as are known in the art.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A computer implemented method of forming a failure estimate for one or more components of a heat recovery steam generator (HRSG), the method comprising:
   receiving at a computing device, failure models for one or more components of the HRSG;
   receiving an indication of one or both of fired hours and fired starts of a turbine to which the HRSG is coupled as part of a scorecard;
   forming from the failure models and at least one of the received indication of fired hours and fired starts, at least one of factored hours and factored starts;
   receiving failure equations for the one or more components; and
   forming the failure estimate by applying at least one of the factored hours and the factored starts to the failure equations.

2. The method of claim 1, further comprising:
   forming the failure models based on prior failure data received from one or more different HRSGs.

3. The method of claim 1, wherein the scorecard further includes an indication of at least one property of a fluid contained within the HRSG.

4. The method of claim 3, further comprising:
   forming a corrosion failure estimate based on a wall thinning failure model and the indication of the at least one property.

5. The method of claim 3, wherein the at least one property is one or more of: pH, and oxygen level.

6. The method of claim 4, further comprising:
   forming one or more of an inspection plan and a maintenance plan based on the failure estimate or the corrosion failure estimate, or both.

7. The method of claim 3, wherein the fluid is water.

8. The method of claim 1, wherein an indication of both fired hours and fired starts are received.

9. A computer implemented method of forming a failure estimate of one or more components of a heat recovery steam generator (HRSG), the method comprising:
   receiving at a computing device, failure models for one or more components of the HRSG;
   receiving an indication of at least one property of a fluid contained within the HRSG;
   forming from the failure models and the at least one property, an estimate of an amount of wall thinning of the one or more components;
   receiving failure equations for the one or more components; and
   forming the failure estimate by applying the amount of wall thinning to the failure equations.

10. The method of claim 9, further comprising:
forming the failure models based on prior failure data received from one or more different HRSGs.

11. The method of claim 9, wherein the indication of the at least one property is received as part of a scorecard.

12. The method of claim 11, wherein the scorecard further includes an indication of one or both of fired hours and fired starts of a turbine to which the HRSG is attached.

13. The method of claim 12, further comprising:
forming an operation failure estimate by applying at least one of the factored hours and the factored starts to the failure equations.

14. The method of claim 9, wherein the at least one property is one or more of: pH, and dissolved oxygen level.

15. The method of claim 9, wherein the fluid is water.

* * * * *